July 31, 1923.
D. F. DOMIZI
JAPANNING APPARATUS
Filed April 15, 1920   6 Sheets-Sheet 1
1,463,313
Fig. 1.
Fig. 2.
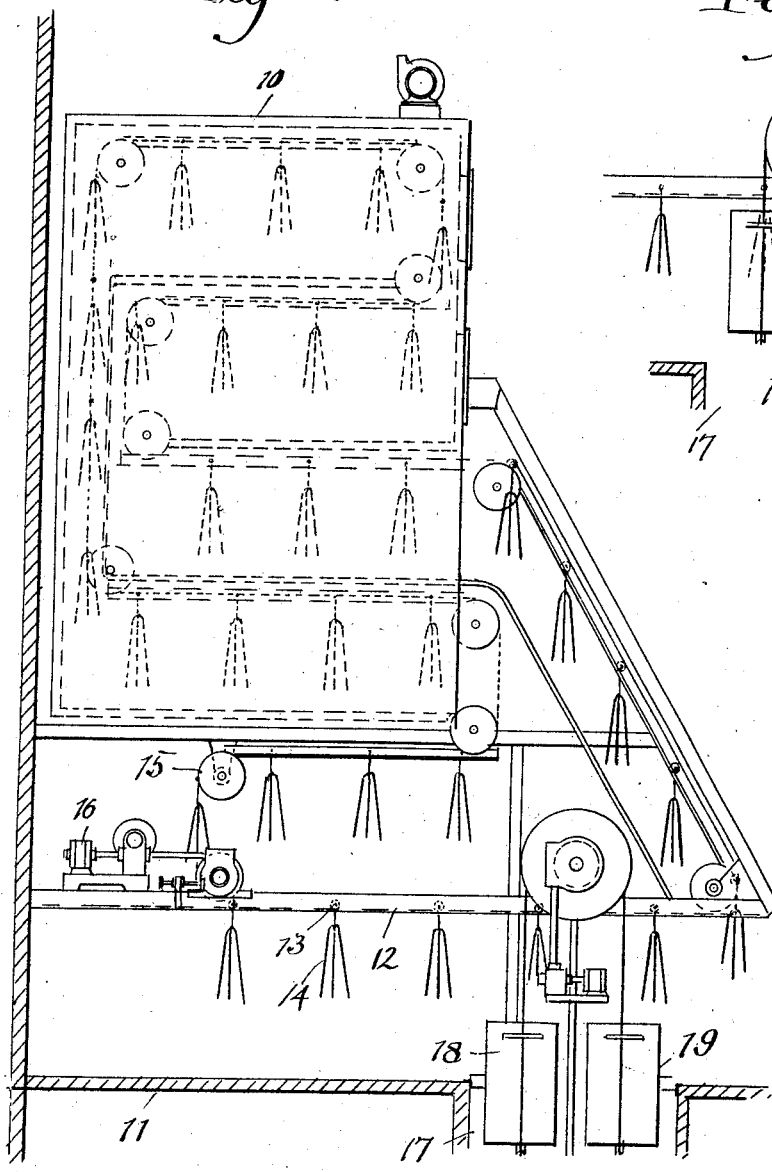
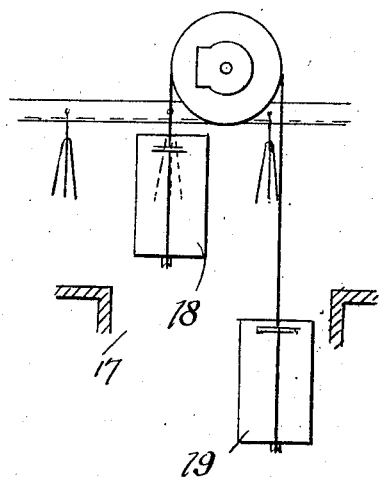
Inventor
David F. Domizi
by Thurston Kwis & Hudson
Attys.

July 31, 1923.

D. F. DOMIZI 1,463,313

JAPANNING APPARATUS

Filed April 15, 1920

6 Sheets-Sheet 5

Inventor:
David F. Domizi
by Thurston Kwis & Hudson
Attys

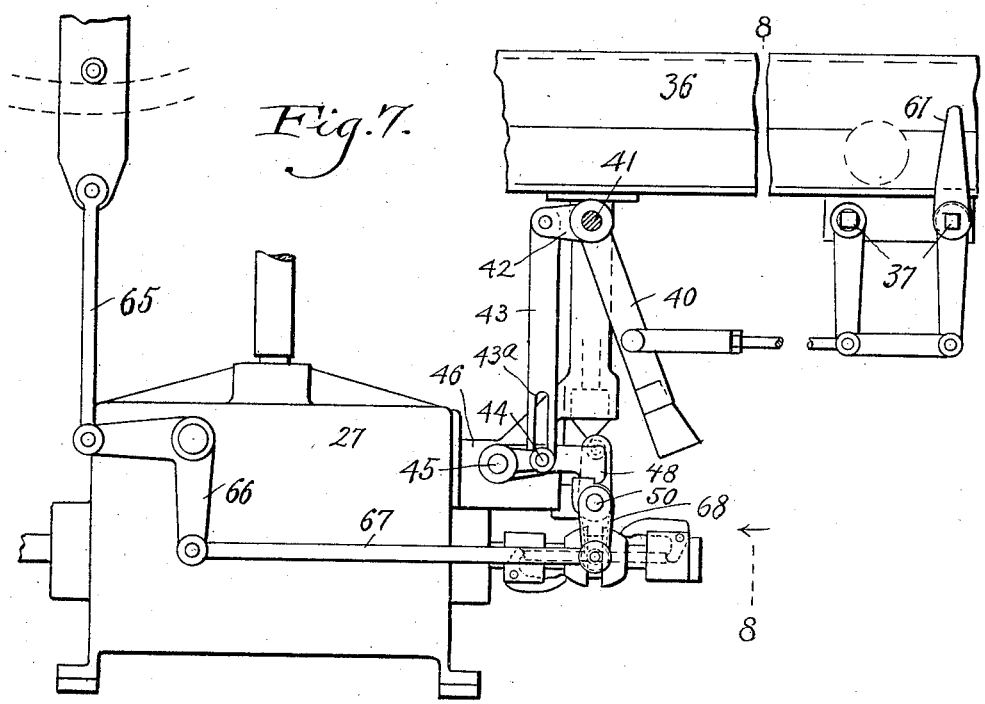
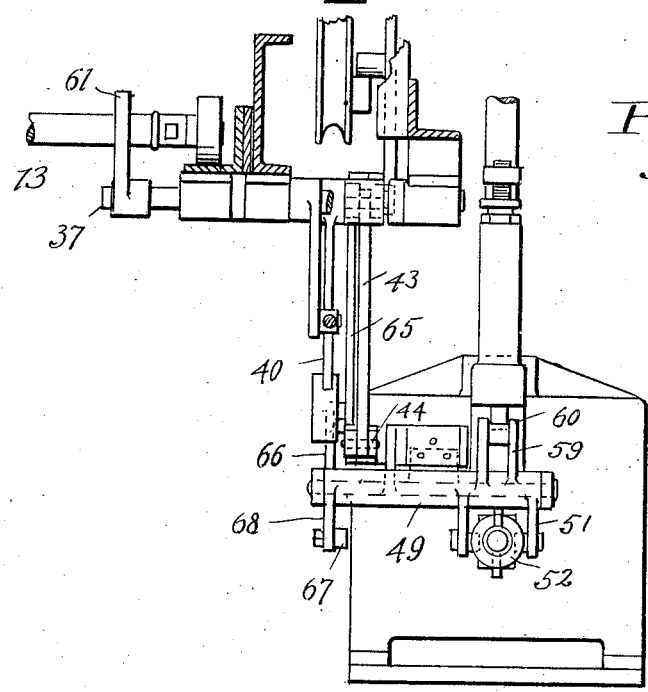

Patented July 31, 1923.

1,463,313

UNITED STATES PATENT OFFICE.

DAVID F. DOMIZI, OF CLEVELAND, OHIO.

JAPANNING APPARATUS.

Application filed April 15, 1920. Serial No. 374,188.

*To all whom it may concern:*

Be it known that I, DAVID F. DOMIZI, a citizen of the United States, residing at Cleveland, in the county of Cuyahoga and State of Ohio, have invented a certain new and useful Improvement in Japanning Apparatus, of which the following is a full, clear, and exact description.

This invention relates to a japanning apparatus, and is a partial division and partial continuation of my prior application, Serial No. 177,188, filed June 27, 1917, which application has resulted in Patent No. 1,381,974, dated June 21, 1921.

More particularly the invention relates to an apparatus for coating articles to be japanned, the objects of the invention being to provide an apparatus for this purpose which is more efficient and satisfactory in operation than the prior devices or mechanisms, and which enables the size of the entire apparatus including both the coating and baking portions to be materially reduced.

The japanning apparatuses heretofore used, have applied the japanning solution to the articles to be japanned, by dragging or conveying them through a suitable stationary trough, tank, or other receptacle containing the solution. I depart from this method of coating by my improved apparatus which includes a movable tank for the solution, so arranged that it can be elevated so as to immerse the articles in the solution as they are conveyed along by the conveyor.

In the preferred embodiment of the invention, two tanks are employed, arranged so that they counterbalance each other, one being lowered while the other is elevated, and one containing the solution for the first coat and the other for the second or subsequent coats. In connection with this apparatus automatic means is provided to first raise and then lower either tank, the desired tank being elevated when the article or articles to be coated are over the tank, and then being immediately lowered, the immersing preferably taking place without stopping the movement of the conveyor.

The invention may be further briefly summarized as consisting in certain novel details of construction, and combinations and arrangements of parts which will be described in the specification and set forth in the appended claims.

Figure 3:
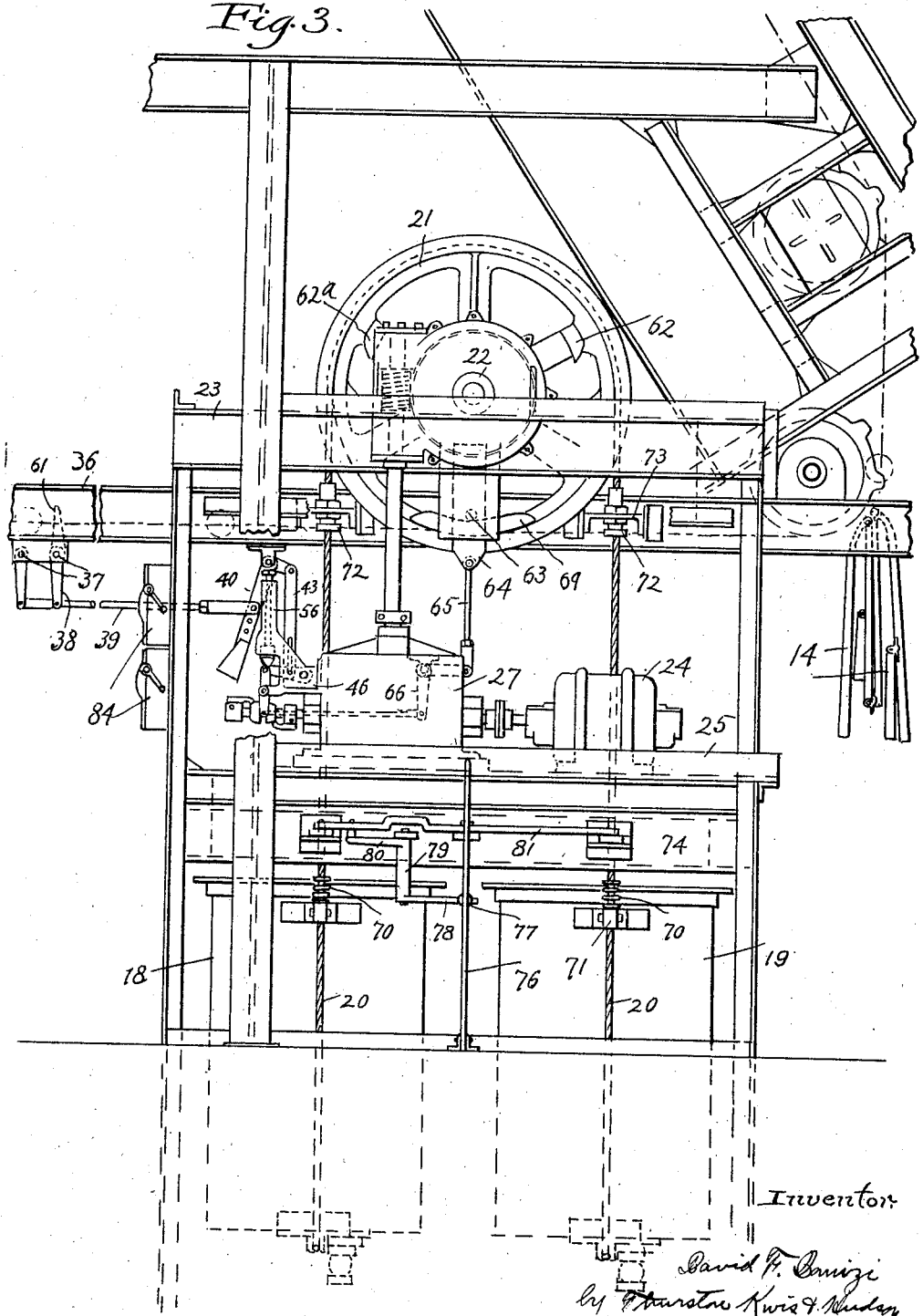
Figure 4:
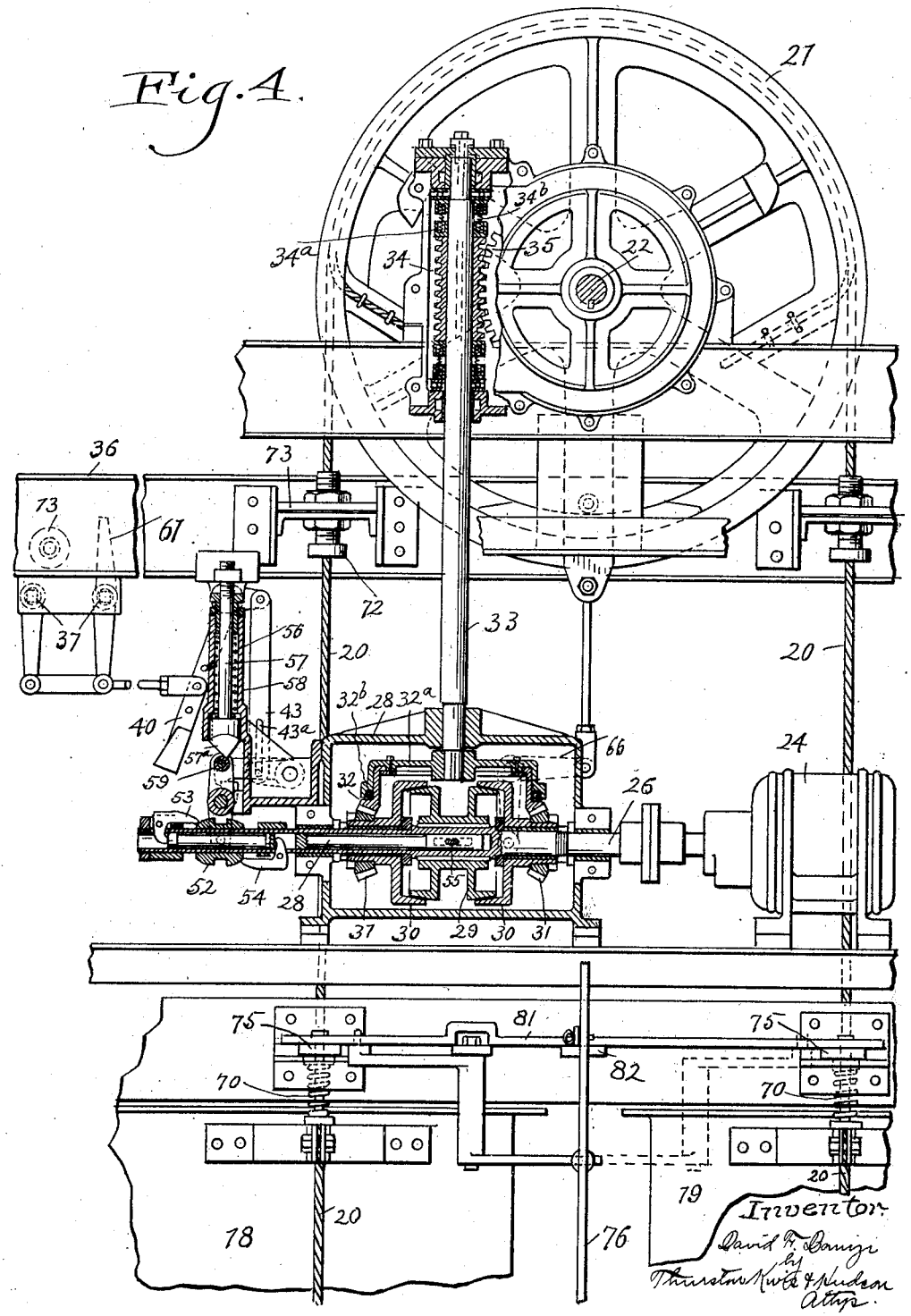
Figure 5:
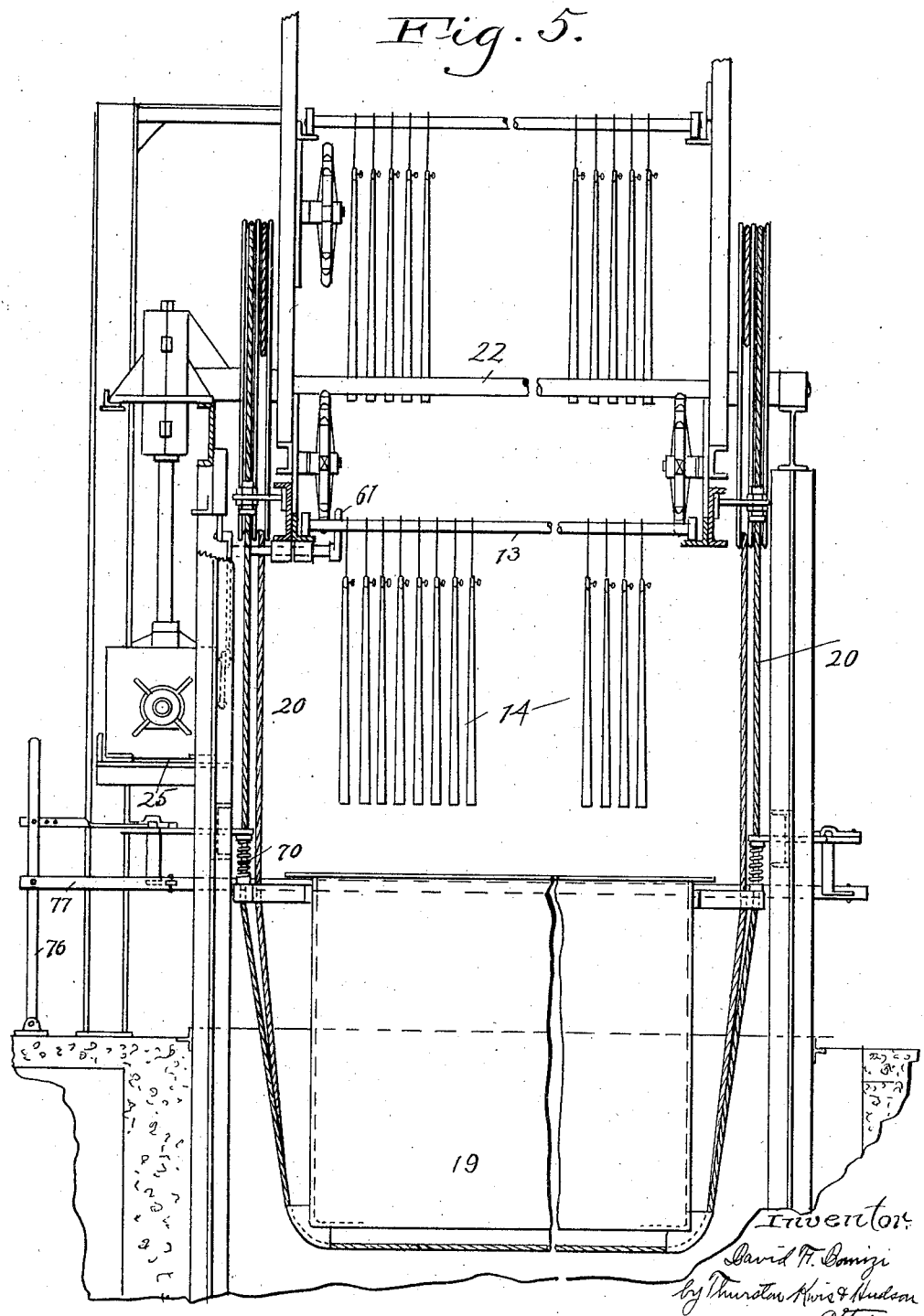
Figure 6:
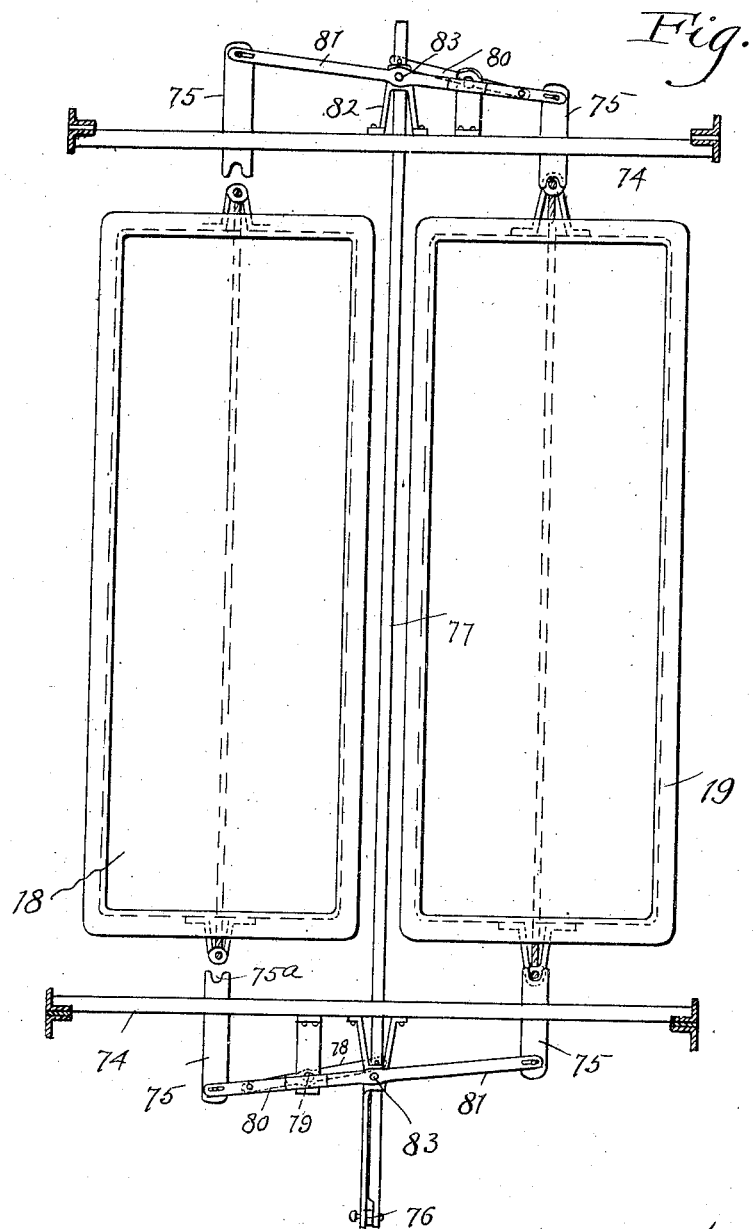

In the accompanying sheets of drawings showing my invention, Fig. 1 is a vertical sectional view through the entire japanning outfit, showing the oven and conveyor, and showing in a simplified form the major portion of the coating apparatus, the latter involving my invention; Fig. 2 is a detached view of the coating apparatus as shown in Fig. 1, showing one of the tanks elevated and the other lowered to illustrate the manner in which the coating solution is applied to the articles which are conveyed along a predetermined course by the conveyor; Fig. 3 is a side view of the coating apparatus constituting the subject matter of this invention, the same being shown on an enlarged scale; Fig. 4 is a similar view with parts in section; Fig. 5 is a transverse sectional view; Fig. 6 is a horizontal view with certain parts in section, illustrating particularly, certain stops which co-operate with the vertically movable tanks; Fig. 7 is a view of a part of the automatic tank elevating and lowering mechanism viewed from the inner side; and Fig. 8 is a sectional view substantially along the line 8—8 of Fig. 7, looking in the direction indicated by the arrows.

Though the improvements herein claimed can be employed with any suitable oven and conveyor system, in Fig. 1 I have shown somewhat conventionally, my improved coating apparatus in connection with the oven and conveyor system constituting the subject matter of my prior application, Serial No. 177,188. The apparatus here shown includes an oven 10, which is supported on a suitable framework above a lower loading and unloading platform 11, which is preferably on the level of the floor of the building in which the japanning apparatus is located. The articles to be japanned are carried past the loading and unloading platform and back and forth through the oven by a conveyor 12, consisting of two endless chains connected together by cross members 13 on which the articles to be japanned are supported, these articles consisting in this case of bow sockets 14. The conveyor travels back and forth along a suitable conveyor frame and around sprockets 15, the arrangement of the parts of the conveyor frame and sprockets being such that the articles are carried horizontally forward along or above the loading and unloading platform 11; then diagonally upward and inward toward the oven; then into and back and forth through the oven to the top; then down to the lower part of the oven; then out from the oven and back again to the lower part which is just above the loading and unloading platform. This conveyor is driven by a motor 16, through suitable reduction gearing which reduces the speed of the conveyor so that the travel of the articles 14 is quite slow.

At the forward part of the loading and unloading platform there is a pit 17 containing two vertically movable tanks 18 and 19, arranged side by side, one preferably provided with the japanning solution which gives the first coat to the articles, and the other the solution for the subsequent coats. These tanks are so mounted and operated that each time a set of articles 14 on one of the cross members 13 of the slowly moving conveyor is above either the tank 18 or 19, (depending upon whether the articles are to receive their first coat, or second or third coat) the proper tank is elevated so as to completely immerse the articles in the solution, or so much of the articles as it is desired to be coated, and then the tank is lowered, and as this is repeated as each set of articles comes over the tank, the entire series supported by the conveyor is coated as the articles are carried horizontally along the lower part of the conveyor frame, and without stopping the movement of the conveyor.

Should it be necessary to apply simply one coat to the articles to be japanned, merely the tank 18 would be utilized, the other then serving simply to counterbalance it. Generally, however, more than one coat is applied to the articles, in which event in applying the first coat the tank 18 would be elevated each time the series of articles supported on the different cross members 13 are above the tank, and after all the articles on the conveyor had received their first coat and had been conveyed through the oven and back again to the loading platform, they would be given their second coat by repeatedly elevating the tank 19 as the articles are conveyed the second time around the course, and the same would be true if the articles were to be given more than two coats.

Referring now to Figs. 3 to 7, it will be observed that the tanks are supported at their ends by cables 20 which extend up to and around sheaves 21 mounted on an upper horizontal shaft 22 (see particularly Fig. 5), suitably supported on the top members 23 of a framework composed of structural materials. As the cables supporting the two tanks pass around the sheaves in different directions it will be apparent that when one tank is elevated the other is lowered, and that the two tanks counterbalance each other.

The tanks are preferably raised and lowered by a motor, the starting, stopping and reversing of the tanks being controlled automatically. For operating the tanks I employ a motor 24 which is supported on a suitable base 25 just beyond the ends of the tanks at one side of the apparatus. By reference to Fig. 4 it will be observed that the motor drives a horizontal shaft 26 which passes through a gear case 27 and out beyond the end of the same. The shaft is hollow for a portion of its length and carries an endwise movable clutch controlling rod 28, which in the manner hereinafter explained, is designed to shift in endwise direction a double clutch element 29 which is connected by a key or feather to the shaft 26 so as to rotate therewith. This clutch element 29 is adapted to be slid when moved in opposite directions into clutching engagement with two separate clutch elements 30, 30, which may rotate freely on the shaft but are held from axial movement thereon, and are provided with sleeve-like hubs carrying bevel gears 31 which engage and alternately drive a bevel gear 32 connected to the lower end of a vertical shaft 33 which extends up through the top of the gear case 27, and near its upper end is provided with a worm 34, engaging a worm wheel 35 on the shaft 22 carrying the tank operating sheaves 21.

Thus it will be seen that when the clutch element 29 is in its mid position, that is, out of engagement with both clutch elements 30, the vertical shaft 33 is not driven and the tanks stand in stationary position at the same level which is shown in Fig. 1, and the other figures, except Fig. 2. The latter figure shows one of the tanks elevated and the other at its lowermost position; in other words, one tank is in a position such that a set of articles 14 to be japanned is immersed in the coating solution of the tank which is about to be lowered to its normal position.

It might be mentioned at this point that to minimize shock on starting and stopping movements of the tanks, yieldable elements are provided in the drive between the motor driven shaft 26 and the upper shaft 22 carrying the tank actuating sheaves. This is accomplished in this case by forming the bevel gear 32 in two parts including the toothed annulus and the body or head 32ª which are yieldingly connected together by coil springs 32ᵇ so that one part may yield relative to the other. Likewise the worm 34 at the top of the vertical shaft 33 can have a sliding axial movement on the shaft, the ends of the worm being engaged by abutments 34ª, each composed of two parts containing yielding springs 34ᵇ.

Taking up now the automatic control of the clutch mechanism by which the motor causes the tanks to be automatically raised and lowered, it will be observed by reference to Figs. 3, 4, 7 and 8, that there are mounted on the lower side of a rail 36 which constitutes the lower part of the conveyor frame, a pair of short rock-shafts 37 having downwardly projecting parallel arms 38 to both of which is connected a horizontal rod 39 which projects toward the gear case 27 and has its forward end connected to a weighted arm 40 mounted on a shaft 41 (see Fig. 7) and provided with a laterally extending short arm 42 to which is connected a vertical link 43. At the lower end of this link 43 is a slot 43ª engaged by a pin 44 carried by a short arm on a rock-shaft 45 mounted in a bracket 46 attached to one end of the gear case 27 (see Fig. 7). On this rock-shaft 45 is a latch 48 which normally holds stationary a clutch yoke sleeve 49 which is mounted on a shaft 50 likewise supported by the bracket 46. This sleeve 49 has a pair of clutch yoke fingers 51 which engage in the groove of a clutch collar 52, mounted on the end of the hollow portion of the motor driven shaft 26 just beyond or at the rear of the gear case 27. This clutch collar 52 which is movable axially of the shaft 26 is adapted to engage and to shift two bell crank shaped clutch operating fingers 53 and 54, both having portions projecting into the hollow shaft 26, one of these portions being at the end of the clutch operating rod 28 as shown in Fig. 4, and the other projecting into a slot of this rod 28. These parts are so disposed that when the clutch collar is shifted in one direction from the position shown in Fig. 4 it will rock the bell crank 53, which will shift the rod 28 to the right and cause the clutch element 29 to engage the right hand clutch element 30, and when the clutch collar is shifted in the opposite direction it will lock the clutch operating bell crank 54 and cause it to shift the rod 28 in the reverse direction and cause the clutch element 29 to engage the left hand clutch element 30. As will be readily understood, the alternate shifting of these two clutch operating bell cranks will cause the motor 24 through the clutch mechanism and driving gears to elevate one tank from its normal mid position and at the same time lower the other tank, and then lower the first-named tank and elevate the second-named tank to their mid position.

It may be mentioned at this point that the clutch operating rod 28 which is axially movable in the hollow portion of the motor driven shaft 26 has its endwise movement transmitted to the middle clutch member 29 by a pin 55 which extends transversely through a hole in the rod 28 and through a slot in the surrounding wall of the hollow shaft 26 so that the ends of the pin will suitably engage and shift axially the clutch element 29.

By reference particularly to Fig. 4 it will be observed that the bracket 46 already referred to, is provided with a vertical barrel 56 containing a plunger 57 which is pressed downward by a coil spring 58 and provided at its lower end with a pointed head 57ª which normally engages slightly to one side of the center of a roller 59 at the top of a pair of arms 60 projecting upwardly from the yoke sleeve 49. In other words, the tendency of this spring pressed plunger 57 is to rock the yoke sleeve 49 so as to shift the clutch collar 52 to the right as viewed in Fig. 4, and thus rock the clutch bell crank 54 and cause the middle clutch element 29 to be shifted to the left so as to engage the left hand clutch element 30. But this plunger 57 is normally prevented from thus acting by the latch 48 when in its normal position shown in Fig. 7.

This latch is lifted, however, so as to permit the plunger 57 to rock the yoke sleeve each time one of the cross members 13 of the conveyor frame reaches a given position. It will be observed by reference to the left hand side of Figs. 3 and 4, and by reference to Figs. 7 and 8, that one of the rock shafts 37, which as before stated, are mounted on the lower side of the rail 36, is provided with an upstanding finger 61 which projects up into the path of movement of the conveyor cross members 13, this being clearly illustrated in the figures of the drawing last referred to, and also in Fig. 5. The parts are so disposed that as each cross member 13 travels along the lower part of the conveyor frame with a slow movement, it engages and rocks this upstanding finger 61. As the finger is being rocked to horizontal position it pulls the rod 39 to the left as the same is viewed in Figs. 3 and 4, and to the right as viewed in Fig. 7. This movement elevates the weighted arm 40 swinging it to the left as viewed in Figs. 3 and 4. At the same time the slotted link 43 is lowered, the slot 43ª permitting this movement without shifting the latch. But when the conveyor cross member 13 passes the finger 61, the weighted arm 40 swings downward like a pendulum, and in so doing it passes beyond its normal position, shown in Figs. 3 and 4, and elevates the slotted link 43. When the bottom of the slot 43ª of the link reaches the pin 44 (see Fig. 7) during this upward movement the link suddenly lifts the latch 48 clear of the yoke sleeve 49, whereupon the spring pressed plunger 57 rocks the yoke sleeve, shifting the clutch collar 52 to the right and rocking the clutch bell crank 54, and this causes the shifting of the clutch element 29 to the left. This results in the motor rotating the tank operating sheaves 21 to elevate the proper tank so as to cause the set of articles 14 which were at such time above the tank being elevated, to be immersed in the solution contained in such tank.

When the tank reaches its uppermost position, the movement of the tank operating sheaves 21 is immediately reversed, and this is accomplished by the following mechanism:

When the sheaves have been turned a predetermined amount sufficient to raise one of the tanks to its uppermost position, one of two cam-shaped lugs 62 and 62ª provided on one of the sheaves 21, engages a roller 63 carried by a vertically movable slide 64, which is supported in the framework alongside the sheave and which is positively connected to the clutch yoke sleeve 49. The lug shifts the roller and slide in a manner such that the mechanism connecting the slide to the clutch yoke sleeve immediately reverses the motor driven mechanism. The particular lug 62 or 62ª which engages the roller 63 and causes this reversal, depends upon whether the tank 18 or the tank 19 was elevated. The mechanism by which the slide 64 is connected to the clutch yoke sleeve 49 to produce the action just stated, is best shown in Figs. 3, 7 and 8, and by reference to these figures it will be observed that the lower part of the slide 63 is connected by a link 65 to one arm of a bell crank 66 which is mounted on the inner side of the gear case 27, while the other arm of the bell crank is connected by a link 67 to a depending arm 68 on the clutch yoke sleeve 49. In consequence, as soon as one of the tanks, which we will assume to be the tank 18 is elevated, the lug 62 by its engagement with the roller on the slide, rocks the clutch yoke sleeve 49 through the parts 64, 65, 66, 67 and 68, and in so doing, shifts the sleeve a predetermined amount in the reverse direction to that in which it was previously shifted by the spring pressed plunger 57. This rocking movement of the clutch yoke sleeve throws the clutch collar to the left, as viewed in Fig. 4, and this movement of the collar rocks the clutch bell crank 53 which shifts the clutch rod 28 to the right as viewed in the same figure, and causes the middle clutch element 29 to engage the right hand clutch element 30.

The tank shifting sheaves are therefore rotated in the reverse direction to that in which they were previously rotated, and when the tanks reach their mid position the movement is automatically stopped by the action of a cam 69 carried by the same sheave having the cam lugs 62 and 62ª, and mounted on the sheave midway between these cam lugs, which cam 69 elevates the roller 63, and through the parts 64, 65, 66, 67 and 68 restores the clutch yoke sleeve to its normal position, causing the middle clutch element 29 to be brought to its central position out of contact with both clutch elements 30, 30. When the parts are thus restored to their normal position the latch 48 automatically locks the clutch yoke sleeve with all parts in normal position illustrated in the drawings.

In addition to the parts above described for starting, reversing and stopping the movement of the tanks, I provide means for causing the stopping and reversing to take place smoothly, and to this end I provide on the cables 20 at the ends of both tanks, coil cushioning springs 70 which rest on abutments 71 secured to the ends of the tanks. I likewise loosely surround the cables near the top of the apparatus with adjustable sleeves 72 which are supported in brackets 73 on the top rail 36, as clearly shown in Figs. 3, 4, and 5. These sleeves 72 are so positioned that when either tank is elevated to the position shown in Fig. 2, i. e. to immerse a set of articles to be japanned in the solution contained in the tank, the coil springs 70 carried at the ends of the tank engage the associated sleeves 72 and are compressed during the final operation of the upward movement of the tank. This not only checks the upward movement of the tank while the clutch mechanism is being reversed, but when the reversal takes place these springs are loaded and assist the driving mechanism to reverse the motion of the tanks. The result is that the tank is moved upwardly to its uppermost position and then its movement is reversed and it starts downward without any delay and without perceptible jar, the whole operation taking place very smoothly.

In a somewhat similar fashion, by the provision of stop devices whose action is best illustrated in Fig. 6, the stopping of the tanks in their mid position is cushioned by the springs at the ends of the tank which was lowered at the time the tank just referred to was elevated. For this purpose I mount in the lower cross members 74 at opposite sides of the frame, endwise movable stop arms 75 which are arranged opposite the ends of the tanks and are provided at their inner ends with notches 75ª, which when the arms are moved inward, receive or fit about the tank lifting cables 20. These stop arms at opposite ends of the tanks are operated in pairs in such a manner that the arms at the end of one tank are moved outward to the position shown in Fig. 6, so as to be free of the cables and of the coil springs 70 surrounding them, while the pair opposite the ends of the other tank are moved inward as shown in the same figure. If the tank 18 is to be elevated, the arms 75 opposite its ends are moved outward so that they will not obstruct the upward movement thereof, while the arms of the other pair are moved inward so that they may serve as abutments to be engaged by the coil springs 70 at the ends of tank 19 when it is elevated to mid position after being lowered from mid position.

The operator controls the position and movement of these two pairs of stop arms by a hand lever 76, pivoted at its lower end, as best shown in Fig. 5 along one side of the apparatus. This lever is pivotally connected to a horizontal rod 77 which passes between the tanks to the opposite side of the apparatus where it is slidably supported, the arrangement being such that when the lever is swung, the rod is given an endwise movement in one direction or the other substantially horizontally. This rod is connected to the lower horizontal arms 78 of two bell cranks 79, rotatably supported in brackets on the lower cross members 74 on opposite sides of the frame, and the upper arms 80 of these bell cranks are connected respectively to two bars 81, at opposite sides of the frame, and supported on brackets 82 of the lower frame members 74, being pivoted to such brackets substantially midway between their ends as shown at 83 in Fig. 6. These bars have pin and slot connections with the ends of the stop arms 75, and though equal rocking movements are imparted to the bars 81, they are swung in opposite directions with respect to each other so that simultaneously the stop arms 75 opposite the ends of tank 18 are moved outward away from the ends of the tank while simultaneously the stop arms opposite the end of tank 19 are moved inwardly and vice versa.

Therefore, if the tank 18 is to be elevated from its mid position, the stop arms are in the position shown in Fig. 6. In other words, the stop arms opposite the ends of tank 18 will not engage the springs 70 at the ends of tank 18 as the latter is elevated, but on the return movement of the tanks to mid position the springs 70 at the ends of tank 19 engage the stop arms opposite the ends of this tank and thus cushion the final movement of these tanks and bring them to a stop smoothly and quietly.

When the tank 19 is to be elevated from mid position, the positions of the stop arms are reversed, in which event the springs at the ends of tank 19 cushion the upper stroke, and the springs at the end of tank 18 cushion the return stroke to mid position.

The particular tank which is elevated to immerse or coat the articles depends upon the direction in which the motor 24 is operated, a reversing motor 24 being employed whose starting, stopping, and direction of rotation are controlled by controlling mechanism 84 shown at the left hand side of Fig. 3, which mechanism is mounted preferably on the framework of the machine in convenient position.

This machine is operated in the following manner: The conveyor is started in operation, and if the articles supported by the conveyor are to be given their first coat, the motor 24 is started in a direction such that the tank 18 will be elevated. As the articles are conveyed along the lower rail of the conveyor frame, each time a set of articles is over the tank the tank is elevated so as to immerse the articles in the solution contained in the tank and is then immediately lowered. This is repeated each time one of the cross members 13 of the conveyor travels past and engages the finger 61 which is so located with respect to the tank that as it is operated the set of articles in advance of the cross member 13 which operates the finger is directly over the tank. As before stated, the elevating and lowering of a tank takes place quickly, or at just the speed desired, so that the time that the articles are immersed in the solution is wholly independent of the rate of travel of the conveyor. This is a distinct advantage over the prior systems wherein the conveyor drags or conveys the articles to be japanned through a stationary receptacle.

If the articles are to be given two coats of the same solution they will be carried twice around the conveyor without making any change in the operation of the coating part of the apparatus. Generally, however, the second coat is provided by the solution in the tank 19. Therefore, when the conveyor has conveyed the first set of articles which were coated, completely around the course so that as they again pass the coating apparatus to receive the second coat, the operator reverses the direction of rotation of the motor 24, and he likewise shifts the hand lever 76 so as to reverse the positions of the stop arms 75 opposite the ends of the tanks. Additionally, in order that the articles will be directly above the tank 19 when it is elevated, the operator shifts the finger 61 from the forward rock-shaft 37 to the companion rock-shaft alongside of it. This shifting of the finger 61 will not be necessary in all instances, as, for example, when the distance between the cross members 13 of the conveyor is equal to the distance between the centers of the two tanks.

On making the changes above enumerated, the movement of the two tanks is reversed, that is to say, the tank 19 is elevated from mid position to coating position, and immediately after is lowered to mid position, while the tank 18 is simultaneously lowered from mid position and then elevated to mid position. In other words, as each set of articles reaches the position above, and substantially centrally above the tank 19 it is coated with the solution in the tank 19 by the automatic elevation of the latter and its subsequent lowering.

If the articles are to be given more than two coats, on the third trip around the course they will again be immersed in the solution in the tank 19, and the same will be true if they are to be given more than three coats. However, if desired, a duplicate set of tanks, operated in precisely the same manner as above explained, may be provided for use in the event the articles are to be given more than two coats, and in case the third, or third and fourth coats are to be applied from solution or solutions other than those contained in the tanks 18 and 19.

It will be understood, of course, that the coating in the manner above explained, and the subsequent baking take place continuously, the conveyor operating motor 16, and the coat applying motor 24 being operated continuously until it becomes necessary or advisable to stop them. It will also be understood that the uncoated articles are applied to, and the japanned articles are removed from the conveyor by one or more operators standing on the loading and unloading platform 11.

Apparatus constructed as above described, has proven by practice to be very efficient in the character of work done by the apparatus, and also very economical as regards the time required to accomplish the japanning, and in the amount of space, particularly floor space, occupied by the apparatus.

It is obvious that many changes may be made in the arrangement of parts and construction of the apparatus. For example, while I regard it as desirable that the two tanks be operated simultaneously in opposite directions, as shown, nevertheless, I consider it within the scope of my invention to operate the tanks independently should more than one be required, or to operate simply one tank when one will suffice. Furthermore, the mechanism shown for operating the tank or tanks while very efficient and satisfactory, might be constructed and operated differently. It should also be understood that the coat applying apparatus herein claimed is not confined in its application to an oven constructed like that illustrated.

Having described my invention, I claim:

1. In an apparatus for japanning articles, a conveyor for the articles to be japanned, means for immersing the articles in a japanning solution comprising a pair of vertically movable receptacles beneath a portion of the conveyor, and means for raising and lowering said receptacles, said receptacles being connected so as to be simultaneously moved in opposite directions.

2. In an apparatus for japanning articles, a conveyor for the articles to be japanned, means for immersing the articles in a japanning solution comprising a pair of vertically movable receptacles arranged so as to counterbalance each other, and means for operating the same so that one is elevated while the other is lowered.

3. In an apparatus for japanning articles, a conveyor for articles to be japanned, means for immersing the articles in a japanning solution comprising a vertically movable receptacle, elevating and lowering sheaves connected to the receptacle, and means automatically operated at intervals for rotating the sheaves first in one direction and then the other to first elevate and then lower the receptacle.

4. In an apparatus for japanning articles, a conveyor for the articles to be japanned, means for immersing the articles in a japanning solution comprising a vertically movable receptacle beneath a portion of the conveyor, and means for repeatedly raising and lowering the receptacle in predetermined timed relationship to the movement of the conveyor, comprising a rotary member connected to the receptacle, a motor, and means for causing the motor to rotate said member in one direction to elevate the receptacle and then to rotate the same in the reverse direction to lower the receptacle.

5. In an apparatus for japanning articles, a conveyor for the articles to be japanned, means for immersing the articles in a japanning solution comprising a vertically movable receptacle, and means controlled by the conveyor for raising and then lowering the receptacle at regular intervals in harmony with the movement of the conveyor.

6. In an apparatus for japanning articles, a conveyor for the articles to be japanned, means for immersing the articles in a japanning solution comprising a vertically movable receptacle beneath a portion of the conveyor, means for moving the receptacle comprising a motor, and automatic means controlled by the conveyor for operatively connecting the motor to the receptacle.

7. In an apparatus for japanning articles, a conveyor for the articles to be japanned, means for immersing the articles in a japanning solution comprising a vertically movable receptacle beneath a portion of the conveyor, means for moving the receptacle comprising rotary cable winding and unwinding means connected to the receptacle, a motor, and means comprising clutching mechanism for operatively connecting the motor to the said winding and unwinding means.

8. In an apparatus for japanning articles, a conveyor for the articles to be japanned, means for immersing the articles in a japanning solution comprising a vertically movable receptacle beneath a portion of the conveyor, means for moving the receptacle comprising a motor, operating mechanism between the motor and receptacle and including a clutch, and means for automatically operating the clutch.

9. In an apparatus for japanning articles, a conveyor for the articles to be japanned, means for immersing the articles in a japanning solution comprising a vertically movable receptacle beneath a portion of the conveyor, means for moving the receptacle comprising a motor, operating mechanism between the motor and receptacle and including a clutch, and means controlled by the conveyor for operating the clutch repeatedly in harmony with the movement of the conveyor.

10. In an apparatus for japanning articles, a conveyor for the articles to be japanned, means for immersing the articles in a japanning solution comprising a vertically movable receptacle beneath a portion of the conveyor, means for moving the receptacle comprising a motor, driving mechanism between the motor and receptacle and including reversing clutch mechanism, means for automatically operating the clutch to elevate the receptacle, and means for automatically operating the clutch to cause the reversal of movement of the receptacle.

11. In combination with a conveyor, an immersing apparatus comprising a vertically movable receptacle beneath a portion of the conveyor, means for moving the receptacle vertically comprising a motor, movement transmitting means between the motor and receptacle and including a clutch, and automatically operated means for causing the clutch to be thrown into engagement.

12. In combination with a conveyor, an immersing apparatus comprising a vertically movable receptacle beneath a portion of the conveyor, means for moving the receptacle vertically comprising a motor, movement transmitting means between the motor and receptacle and including a clutch, spring actuated means for causing the clutch to become engaged, a latch for holding the clutch disengaged, and means for automatically operating the latch.

13. In combination with a conveyor, an immersing apparatus associated therewith and comprising a vertically movable receptacle beneath a portion of the conveyor, a motor for causing the receptacle to be raised and lowered, a movement transmitting means between the motor and receptacle comprising a reversing clutch, means for causing the clutch to be engaged so as to elevate the receptacle, means for actuating the clutch so as to lower the receptacle, and means for automatically disengaging the clutch when the receptacle has been lowered.

14. In combination with a conveyor, an immersing apparatus associated therewith comprising a vertically movable receptacle beneath a portion of the conveyor, a motor for moving the receptacle, movement transmitting means between the motor and receptacle comprising a reversing clutch, spring actuated means for causing the clutch to become engaged so that the motor will elevate the receptacle, a latch normally holding the clutch disengaged, means for automatically actuating the latch so as to permit said clutch operating means to operate, means for automatically causing the clutch to be actuated so as to cause the receptacle to be lowered, and means for automatically disengaging the clutch.

15. In combination with a conveyor, an immersing apparatus associated therewith comprising a pair of vertically movable receptacles arranged so as to counterbalance each other beneath a portion of the conveyor, and automatically controlled means for causing one receptacle to be elevated while the other is lowered and then stopping and reversing the movements of the two receptacles, and finally causing them to be stopped in their former and normal positions.

16. In combination with a conveyor for articles to be treated, an immersing apparatus including a vertically movable receptacle beneath a portion of the conveyor, means for causing the receptacle to be elevated and then lowered, and means for cushioning the receptacle as it comes to a stop in elevated position, said cushioning means being adapted to apply an initial impulse to said receptacle in its downward movement.

17. In combination with a conveyor for articles to be treated, an immersing apparatus including a vertically movable receptacle beneath a portion of the conveyor, means for causing the receptacle to be elevated and then lowered, and means for cushioning the receptacle when it comes to a stop in elevated and lowered positions.

18. In combination with a conveyor, an immersing apparatus including a pair of vertically movable receptacles arranged so as to counterbalance each other beneath a portion of the conveyor, means for raising and lowering the receptacles, and cushioning means for causing the receptacles to be brought to a stop smoothly.

In testimony whereof, I hereunto affix my signature.

DAVID F. DOMIZI.